Patented Jan. 1, 1946

2,392,258

UNITED STATES PATENT OFFICE 2,392,258

PRODUCTION OF GUM DEXTRAN

William Ludwell Owen, Jr., and William L. Owen, Baton Rouge, La.

No Drawing. Application January 22, 1942, Serial No. 427,839

4 Claims. (Cl. 195—12)

The present invention relates to the production of gum dextran from carbohydrates and more particularly from polysaccharides by bacteriological fermentation.

Gum dextran is a water soluble colloidal material which may be produced by the hydrolysis of polysaccharides, there also resulting as a by-product a mono-saccharose type of sugar. This hydrolytic action may be induced by a number of bacteria, but the genus *Leuconostoc mesenteroides* (Cienkowski) Van Tieghem, Bergey's Manual Determinative Bacteriology, fifth edition, is the most efficient from the standpoint of yields of any of the known bacteriological agents adapted for the fermentation of carbohydrates. It may be stated that the isolation of the above species was first accomplished in 1878. The yields obtained by the use of the above bacterium are, however, from a commercial viewpoint, rather low and prohibit the utilization of this type of reaction for the economic and efficient production of gum dextran.

The gum dextran produced by fermentation with the above-mentioned bacterium has the formula $(C_6H_{10}O_5)n$, is a mucilaginous substance which is dextro-rotatory with a value of approximately $a/D$ plus 200, and is characterized by a high viscosity. Gum dextran is precipitated by alcohol, is soluble in alkalis, and can be hydrolyzed into dextrose by sulphuric acid.

The conversion of sucrose into gum dextran may be illustrated by the following reaction:

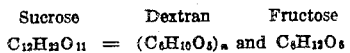

The above equation, however, does not include side reactions involving the generation of by-products including acids and fermentation gases.

Gum dextran may be produced by employing the following aqueous substrate:

Table 1

| | | |
|---|---|---|
| Cane sugar | grams | 150 |
| Tryptone | do | 10 |
| Yeast extract | do | 1 |
| Water | ccs | 1000 |
| Di-potassium phosphate | gram | 1 |

The substrate or medium is sterilized at 250° F. for about 30 minutes and then seeded with 10 ccs. of a culture of species *Leuconostoc mesenteroides* (Cienkowski) Van Tieghem. Thereafter, it is incubated at a temperature varying between 25° to 30° C. At the end of 48 hours, the solution is so viscous that it appears like a solid mass of jelly and can only be shaken from the flask containing the same with great difficulty.

It has been usual to employ refined sucrose or refined cane sugar as the carbohydrate medium which is fermented to produce the carbohydrate gum, 1 pound of the latter being formed for each 2 pounds of sucrose used. It has been discovered that if raw sucrose is used as the carbohydrate medium to be fermented, that the yield of gum dextran is equally as high as if the refined sucrose is used. This is highly advantageous since the raw sucrose, that is, sucrose produced from any of the usual sources and the usual methods but not refined, costs about 65% of the refined product.

While substitution of a raw polysaccharide for a refined polysaccharide is a step forward in order to make the gum dextran available in good yields, and at a reasonable cost, this did not solve the problem which was presented as the cost of the tryptone nutrient material essential for the fermentation agent still remained too costly. In an effort to still further solve the problem, numerous experiments were carried out after it had been initially discovered that the fermentation agent is critical and selective in its nitrogen demands, and cannot utilize this element of nutrition in an inorganic form or in the form of undigested protein.

It has been discovered that autolyzed yeast is essential as a supplementary nutrient to the development of gum dextran of maximum viscosity by the fermentation of a polysaccharide by the species *Leuconostoc mesenteroides* (Cienkowski) Van Tieghem in the presence of a principal nutrient such as dried blood and/or tankage, as clearly indicated in the following table which sets forth the results of a selected series of experiments:

Table 2

| No. | Ingredient and amount by volume in 1000 ccs. of substrate | Time (Hours) | Viscosity |
|---|---|---|---|
| 33 | 1% dried goat's blood and 1% tankage | 72 | 180 |
| 34 | 1% dried goat's blood, 1% tankage and 0.5% dried autolyzed yeast | 72 | 460 |
| 35 | Same as above only 0.1% dried autolyzed yeast | 72 | 900 |
| 36 | Same as above, tankage reduced to 0.5% | 72 | 195 |
| 37 | Blood 0.5%, tankage 1% and autolyzed yeast 0.1% | 72 | 1,260 |
| 41 | Autolyzed yeast 0.1%, tryptone 1.0% | 72 | 650 |

It may be stated that the viscosity determinations set forth in the above table were made by measuring the time in seconds required for 50 ccs. of the substrate to flow through a ⅛ inch aperture of a glass burette containing 100 ccs. of the solution or substrate, the viscosity of which is to be determined.

The above table clearly indicates that when using dried blood or tankage, or a combination of the two, for the development of maximum viscosities, it is necessary that these principal nutrient media be supplemented by an additional nutrient medium such as autolyzed yeast. It is preferred that the amount of blood and tankage taken together vary between about 1% to 2.5% taken by volume on the polysaccharide substrate and that the percentage of autolyzed yeast vary between about 0.1% to about 1% taken by volume on the polysaccharide substrate.

The polysaccharide substrate may also be fermented by the species Leuconostoc mesenteroides (Cienkowski) Van Tieghem in the presence of a nutrient medium selected from the group consisting of compressed yeast, urea, meat scrap, fresh blood, shrimp meal, and peptonized tankage. However, the yield of gum dextran does not approach that which is produced by using a composite nutrient medium comprising blood in the presence of autolyzed yeast or the mixture of blood and tankage in the presence of autolyzed yeast.

It has also been discovered that digested protein-containing material derived from cereal materials such as digested wheat bran, soya bean meal, and the like, give excellent results when used as a nutrient medium for the propagation of the species Leuconostoc mesenteroides (Cienkowski) Van Tieghem, equaling, if not exceeding, the results obtained when using tryptone and yeast extract. The digested cereal nutrient medium is much less costly than tryptone, and considerably cheaper than any of the nutrient media set forth in Table 2.

A wheat bran extract suitable as a nutrient medium for the fermentation of a polysaccharide, as for example, a refined or raw sucrose, may be prepared as follows. To 350 grams of wheat bran there may be added 1 liter of water. The resulting mash is allowed to stand at a suitable temperature favoring proteolyzation, as for example, a temperature varying between about 45° to 50° C. While usually about 24 hours is required for proteolyzation, this period may vary depending upon the particular kind of wheat bran used, and to some extent, the amount thereof. The proteolyzation temperature may also vary in accordance with the physical and chemical characteristics of the protein and carbohydrate material being treated. The extract was added in the proportion set forth in the following Table 3, to a substrate such as set forth in Table 1, the bran extract being substituted for the tryptone or tryptone and yeast extract. Table 1 sets forth a 15% sucrose substrate.

Table 3

| Sample No. | Amount extract per liter | Amount other nutrients per liter | Viscosity 72 hr. period of ferment | |
|---|---|---|---|---|
| | | | Trans. 2 | Trans. 3 |
| 42 | 250 ccs | 1.0 gram dried autolyzed yeast. | 75 | 100 |
| 43 | 125 ccs | ----do---- | 110 | 380 |
| 44 | 60 ccs | ----do---- | 195 | 450 |
| 45 | 30 ccs | ----do---- | 235 | 1,320 |
| 46 | 15 ccs | ----do---- | 320 | 1,320 |
| 47 | 30 ccs | None | 720 | 2,700 |
| Yeast extract | 0.1% | | | |
| Tryptone | 1.0% | None | 650 | |

In the above table, "72 hours" refers to the duration of fermentation. "Transfers 2 and 3" refer to the stages from the parent culture. For example, No. 3 was seeded from No. 2.

Table 3 clearly indicates that 30 ccs. of the above set forth bran extract present in 1 liter of solution or substrate functions as an excellent nutrient medium for the fermentation agent Leuconostoc mesenteroides (Cienkowski) Van Tieghem. However, to develop an optimum viscosity of the character set forth; that is, a viscosity of the order of 720 in 72 hours and 2700 in 72 hours, requires 24 hours more than that required by the tryptone and yeast extract previously referred to.

It has also been discovered that if cane juice or filter press mud is added to a substrate containing as the nutrient medium a cereal extract, and more particularly a wheat bran extract of the character above set forth, in the amount of 40 ccs. per liter, said substrate also having present a raw sugar mash of 15 Brix, a gum dextran of desired viscosity may be obtained in 48 hours, equal, if not superior, to that obtained when tryptone and yeast extract are used.

The results of a series of selective experiments are set forth in the following table:

Table 4

| Sample No. | Amt. cane juice per liter | Amt. other ingredients per liter | Viscosity 48 hrs. |
|---|---|---|---|
| 68 | None | 0.1% yeast extract | 420 |
| 69 | 10% | None | 510 |
| 70 | 5% | ----do---- | 1,680 |
| 71 | All cane juice | 10% raw sugar | 15 |
| 64 | None | Bran extract 40 ccs | 60 |

It is clear from the above that cane sugar juice has a marked stimulative action on the production of gum dextran from a polysaccharide including sucrose when the species Leuconostoc mesenteroides (Cienkowski) Van Tieghem is used as a fermentation agent.

It has also been discovered that gum dextran may be produced exceedingly economically from blackstrap molasses obtained in the manufacture of beet sugar or cane sugar. Cane blackstrap, while more plentiful and somewhat lower in price than that produced in the manufacture of beet sugar, has a larger portion of its sugar content in the form of mono-saccharoses, and the latter do not yield gum dextran by the type of fermentation herein set forth. A representative type of blackstrap molasses from cane sugar has a total sugar content of 55% and about one-third of said sugar content is in the form of invert sugar; that is, dextrose and fructose. As the latter are mono-saccharoses, it is clear why a relatively lower yield of gum dextran is obtained from cane sugar blackstrap molasses as compared to that yield obtained from sucrose which is a di-saccharose and present in an exceedingly large proportion in blackstrap molasses obtained during the manufacture of beet sugar. It has been ascertained that the high content of unconvertable mono-saccharoses present in cane blackstrap is not only objectionable because it is not available for conversion into gum dextran, but in addition, these mono-saccharoses have the further disadvantage that they are more susceptible to fermentation than is true of the unconverted higher saccharoses. A typical blackstrap beet molasses has the following composition:

Table 5

| | |
|---|---|
| Brix | 84.2 |
| Sucrose | 54.4 |
| Raffinose | 3.1 |
| Ash | 11.4 |
| Organic N | 1.24 |
| Nitrate N | 0.26 |

Blackstrap beet molasses, of which the above analysis is typical, therefore contains approximately 7 pounds per gallon of polysaccharoses available for conversion into dextran, utilizing as the fermentation agent the species *Leuconostoc mesenteroides* (Cienkowski) Van Tieghem. Since the market value of blackstrap molasses from beet and cane are approximately the same, the utilization of the beet blackstrap molasses as the material for conversion into gum dextran, using the species *Leuconostoc mesenteroides* (Cienkowski) Van Tieghem, results in materially lower costs.

It has further been discovered that the gum dextran composition produced as herein set forth may be reduced in any suitable manner to a dry powder. Preferably, the viscous mass may be spray dried. The following substrate was prepared and seeded with 10 ccs. of a culture of the species *Leuconostoc mesenteroides* (Cienkowski) Van Tieghem, and incubated in the general manner hereinbefore described.

Table 6

| | | |
|---|---|---|
| Raw sugar | grams | 150 |
| Cane sugar | cc | 50 |
| Bran extract | cc | 30 |
| Water | cc | 1000 |

The gum dextran composition produced by the seeding of the above set forth substrate with species *Leuconostoc mesenteroides* (Cienkowski) Van Tieghem has the following analysis after being dried and powdered:

Table 7

| | | |
|---|---|---|
| Moisture | per cent | 3.54 |
| Ash | do | 3.79 |
| Invert sugar | do | 8.18 |
| Specific gravity | | 0.6561 |
| Gum dextran | | 84.49 |
| Viscosity: | | |
|    10% gum by weight using Dudley pipette | | 67 |
|    Water | | 31 |

When any of the fermented mashes herein set forth are unstable or partially unstable by virtue of the presence in the fermented mash of fermentation by-products, a fermentation suppression agent may be added to stabilize the fermented mash. It has been ascertained that the phenols including the monohydric and dihydric phenols, their substitution products and their derivatives, function adequately as fermentation suppression agents. More specifically, it has been ascertained that the addition of approximately 2% of crude cresylic acid substantially inhibits fermentation of gum dextran compositions containing sugars normally producing fermentation by-products.

Instead of using cresylic acid, phenols may be used, as for example, thymol and phenylic derivatives including sodium phenate. As these latter fermentation suppression agents have higher "phenol coefficients," amounts as small as 5% to 1% thereof may be used. Instead of using the phenols as fermentation suppression agents, formaldehyde may be used. There are many prior art preservatives which may be used. The criterion of use is that the preservatives must suppress fermentation and not deleteriously affect the physical and the chemical properties of the gum dextran during the time it is being prepared or during the time it is kept in storage in its viscous or in its dry, solid, or powdered state. It is desired to point out that the percentage of fermentation suppression agent which may be added to the fermented mash will vary with the percentage of degraded sugars or other carbohydrate compounds, or unreacted protein compounds or derivatives thereof which are present in the fermentation mash and are capable of producing fermentation by-products. In general, the amount of fermentation suppression agent which is added to the fermented mash will vary from about .25% to about 2% or 2.5%, said percentage being taken on the volume of the fermented substrate; that is, for example, 2 ccs. are added per 100 ccs. of the fermented substrate. It is desired to point out that the crude cresylic acid above set forth contains a small amount of phenol, the three cresols, meta, para and ortha, and considerable amounts of higher phenols including xylenols. The cresylic acid may also contain some of the higher tar acid fractions.

The gum dextran may be isolated from its substrate by the addition of a suitable precipitating agent, the substrate having been first neutralized with any of the prior art neutralization agents, as for example, sodium hydroxide. Preferably the gum dextran is precipitated from its substrate by the addition of ethyl, propyl, or isopropyl alcohols. For complete precipitation of the gum approximately 2 parts of 95% alcohol are required to 1 part by volume of the substrate. After the substrate has been treated with an alcohol precipitating agent as above set forth, the alcoholic solution is decanted and the gum dextran freed from residual alcohol by drying. This product may then be dried further and pulverized, or it may be spray dried. The gum dextran so prepared has the advantage that it is substantially free of by-products susceptible to fermentation.

The cost of the gum dextran prepared in the above manner is relatively high. However, this method of recovering the gum dextran can be used when there is simultaneously recovered from the fermented mash lactic acid and the unfermented levulose. These products may be recovered from the alcoholic solution remaining after the precipitation of the gum dextran by distilling the alcohol from the alcoholic solution, recovering the same for subsequent use, and then precipitating lactic acid from the alcohol-free solution by the addition of a suitable precipitating agent, such as zinc carbonate, which forms an insoluble zinc lactate which may be removed from the solution by filtration. The levulose solution which, it has been ascertained, is decolorized by the action of the zinc, may be concentrated under a vacuum and sold as a levulose syrup, for which there is a considerable demand.

The gum dextran composition herein set forth, and particularly the powdered form analytically referred to in Table 7 has many uses in the industrial arts. The gum dextran composition may be used as a gelating agent, a viscosity enhancer, and as an adhesive and/or stiffening agent for paper, fiber board, textiles, leathers and similar articles. It also finds application as an adhesive in the veneer and plywood art. The gum dextran compositions herein disclosed may also be used in the form of thin solutions as sizing compositions for filling the pores of a porous base material prior to the application thereto of a final coating or servicing composition. As the gum dextran composition is basically colloidal in nature, it may also be used to shrink fabrics, paper and similar porous sheet material over a frame or similar support.

The term "tankage" as herein used refers to the press cake obtained from the abbatoir by-products plants. This press cake is usually dried, broken up, and used in the industry as filler for fertilizer compositions. A typical analysis of tankage is as follows:

| | Per cent |
|---|---|
| Crude protein | Not less than 60 |
| Crude fat | Not less than 6.0 |
| Crude fibre | Not less than 3.0 |

The term "filter press mud" as herein used identifies the cake obtained from filter presses in sugar factories through which is passed the settlings from clarified cane juices. The mud contains most of the colloids and the protein that was present in the freshly extracted juices together with the lime used in clarification.

It is desired to point out that the degree of viscosity of the fermented polysaccharide is an index of the concentration of the amount of gum present in the fermented substrate. While the amount of gum present in the fermented substrates may be determined by alcohol precipitation and weighing the precipitate, the results obtained will include substances such as ash and other non-sugars which contribute little, if any, to the viscosities of the fermented substrates, or to the depression or prevention of filter losses, these properties being the ones which are of primary importance in connection with the present invention. Therefore, the viscosity values are much better indices of the ultimate value of the fermented product.

Having thus described the invention, what is claimed as new and desired to be secured by Letters Patent is:

1. The method of producing gum dextran comprising fermenting to a viscous mass a polysaccharide substrate in the presence of species *Leuconostoc mesenteroides* (Cienkowski) Van Tieghem and a nutrient medium therefor containing autolyzed yeast, blood and tankage, the percentage of the blood and tankage predominating over that of the autolyzed yeast.

2. The method of producing gum dextran comprising fermenting to a viscous mass a polysaccharide substrate in the presence of species *Leuconostoc mesenteroides* (Cienkowski) Van Tieghem and a nutrient medium therefor containing autolyzed yeast, blood and tankage, the percentage of autolyzed yeast varying between about 0.1% to about 1.0%, and that of the blood and tankage taken together varying between about 1.0% to about 2.5% taken by volume on the polysaccharide substrate.

3. The method of producing gum dextran comprising fermenting to a viscous mass a polysaccharide substrate containing species *Leuconostoc mesenteroides* (Cienkowski) Van Tieghem, and a nitrogen-supplying nutrient medium having present a digested protein-containing cereal extract and supplementary thereto autolyzed yeast.

4. The method of producing gum dextran comprising fermenting to a viscous mass a polysaccharide substrate containing species *Leuconostoc mesenteroides* (Cienkowski) Van Tieghem, and a nitrogen-supplying nutrient medium having present a digested protein-containing wheat bran extract and supplementary thereto autolyzed yeast.

WILLIAM LUDWELL OWEN, JR.
WILLIAM L. OWEN.